United States Patent Office 3,536,653
Patented Oct. 27, 1970

---

3,536,653
ETHYLENE-PROPYLENE RUBBER COMPOSITIONS CONTAINING AMORPHOUS POLYPROPYLENE AND EXTENDER OIL
Frederic W. Bickel, Burbank, and Gerald H. Peterson, Santa Monica, Calif., assignors, by mesne assignments, to McDonnell Douglas Corporation, Santa Monica, Calif., a corporation of Maryland
No Drawing. Filed June 30, 1965, Ser. No. 468,570
Int. Cl. C08d 9/08, 11/02; C08f 45/28
U.S. Cl. 260—33.6
14 Claims The instant invention relates to an oil extended ethylene-propylene rubber composition consisting essentially of an ethylene-propylene copolymer rubber component or an ethylene-propylene terpolymer rubber component, together with an extender oil, and is particularly concerned with oil extended ethylene-propylene rubber compositions, especially those employing an ethylene-propylene terploymer, having incorporated therein a material which substantially increases the tackiness of such rubber and at the same time functions in conjunction with the extender oil to provide ethylene-propylene rubber blends having suitable viscosity for processing while permitting the use of higher molecular weight ethylene-propylene rubbers together with substantial amounts of extender oil. The invention is also concerned with a novel composition consisting essentially of an extender oil and a material soluble therein and which functions as a tackifier for ethylene-propylene rubber, said composition being adapted for addition to an ethylene-propylene polymer to form an ethylene-propylene uncured rubber composition or blend having the above noted improved properties.

Ethylene-propylene rubbers are now well known materials. A typical ethylene-propylene copolymer rubber can be manufactured by copolymerization of ethylene and propylene, by passing ethylene and propylene gases into normal hexane in which the necessary catalysts are in solution. A typical catalyst system can contain vanadium oxychloride and triethyl aluminum chloride, the proportions of which may be varied to produce polymers of various molecular stereospecificities. The copolymerization is carried out in the absence of any moisture. Atmospheric or moderately elevated pressures and normal room temperature are suitable. During the course of copolymerization, the system becomes thick and viscous. The thick, viscous reaction mixture is washed with water to remove the catalyst and the solvent is removed by flashing.

More recently, ethylene-propylene terpolymer rubbers have been developed which are produced by polymerization of ethylene, propylene and a small amount of a third monomer. Such third monomer is generally a diene, and can be a conjugated or non-conjugated straight chain diene, or a non-conjugated cyclic diene. Examples of such straight chain conjugated dienes are 1,3-butadiene and isoprene, and examples of the non-conjugated dienes are dicyclopentadiene, 2-methylenenorbornene, 11-ethyl-1,11-tridecadiene, and 2-(2'-ethyl-2'-butenyl)norborne. The ethylene-propylenediene terpolymer can be obtained, for examples, by introducing the diene, e.g., 11-ethyl-1, 11-tridecadiene, into a solvent such as tetrachloroethylene, and then introducing ethylene and propylene gases into the solution containing catalyst, for examples, a combination of aluminum triisobutyl and vanadium oxychloride. The precipitated polymer is washed with methanol and acetone, and is then dried. In such terpolymer rubbers the mole percent of the diene component is substantially less than the mole percent of either ethylene or propylene.

Typical ethylene-propylene copolymer or terpolymer rubbers can contain, for example, about 40 to about 60 mole percent ethylene and about 60 to about 40 mole percent propylene. In a typical ethylene-propylene terpolymer rubber, about 0.1 to about 1.0 mole of diene monomer per kilogram of copolymer, can be employed. The molecular weight of the ethylene-propylene copolymer or terpolymer can range from about 100,000 up to as high as 4,000,000 or more, particularly in the case of the terpolymer. The ethylene-propylene polymers of intermediate molecular weight are those which have a molecular weight ranging from about 1,000,000 to about 1,500,000 and have a corresponding Mooney viscosity in the range of about 135 to about 150. The lower molecular weight polymers, e.g., having a molecular weight of less than 1,000,000 and the above noted intermediate molecular weight polymers, are those which have found widest use in industry. The higher molecular weight ethylene-propylene polymers are generally considered to be those having a molecular weight of at least about 2,000,000, for example, ranging from about 2,000,000 to over 4,000,000. Such higher molecular weight polymers have a Mooney viscosity ranging from about 175 up to substantially above 200, which is the upper limit of measure of the Mooney viscometer.

Both the ethylene-propylene copolymer and terpolymer rubbers are relatively inexpensive rubbers and have excellent physical properties which render them highly useful for industrial purposes. For example, these polymers have excellent high temperature resistance, abrasion resistance, ozone and oxygen resistance, weathering and age resistance, and resilience, and have low hysteresis loss. In general, these rubbers have a combination of properties rendering them exceedingly useful in making automobile tires, except for the fact that they lack the degress of tackiness which is required in the process of manufacturing tires.

In the manufacture of tires, in accordance with conventional procedure, strips of rubber covered cord are applied in laminar fashion to a form to produce the carcass, and in so doing it is important that each layer be securely bonded to each adjoining layer without inclusion of air bubbles or pockets. In the next step in the manufacture of tires, a breaker strip is applied to the previously formed carcass. At this step, it is also important that a secure bonding be achieved with no air pockets. Finally, the sidewall and tread are applied and it is again important that a secure bonding be achieved with no air pockets. In each of these stages uncured rubber compound is employed, and to achieve good bonding and to eliminate air pockets, it has been recognized that the uncured rubber compound should be a tacky rubber compound which if not tacky will not bond well to adjoining layers and will leave air pockets. The term "tack" or "tackiness" is understood to mean the characteristic of rubber which causes two fresh surfaces thereof to adhere or coalesce. This property is of critical importance in the manufacture of tires.

Ethylene-propylene-rubbers, including both the copolymers and terpolymers described above, as provided heretofore, have lacked tackiness and therefore have not been adapted readily to the manufacture of tires. By the term "ethylene-propylene rubber" or "ethylene-propylene rubbers" is meant both ethylene-propylene copolymer rubbers and ethylene-propylene terpolymer rubbers as described above.

In the copending application of Frederic W. Bickel et al., Ser. No. 421,727, filed Dec. 28, 1964, now abandoned, there is described and claimed the incorporation of amorphous polypropylene, into ethylene-propylene rubbers to substantially increase the tackiness of the uncured rubber composition.

Ethylene-propylene rubbers can be processed in the pure state, but it has been common practice to extend such polymers with extender oils. Oil extension of ethylene-propylene polymers, particularly ethylene-propylene terpolymers during manufacture has certain advantages including, for example, the avoidance of costly and long mixing cycles, and produce polymers superior in various respects to commercially available unextended rubbers. Although the incorporation of such extender oils into the ethylene-propylene polymers provides a certain degree of increased tack, the level of tack provided by the oils alone, however, is insufficient for those applications, particularly the manufacture of tires, requiring a high degree of tack.

The higher molecular weight ethylene-propylene polymers such as those having a molecular weight in excess of about 2,000,000, when compounded, yield rubbers of superior properties such as high tensile strength. However, these polymers are difficult to process even when large amounts of extender oil are incorporated, and this problem is further complicated by the fact that regardless as to the amount of extender oil which is added to such higher polymers, as previously noted, such rubbers have insufficient tack for important applications such as tire manufacturing.

It is accordingly one object of the invention to provide an oil extended ethylene-propylene rubber having improved tackiness characteristics.

A further object of this invention is the provision of an uncured ethylene-propylene rubber composition which can be readily processed, containing a high molecular weight ethylene-propylene polymer and substantial amounts of extended oil, and which also possesses substantial tackiness.

A still further object of the invention is the provision of an uncured ethylene-propylene rubber which has a Mooney viscosity rendering the uncured rubber blend easily processed, and containing high molecular weight ethylene-propylene polymer of the order of about 2,000,000 or more, a substantial proportion of extender oil, e.g., at least about 100 parts per 100 parts by weight of ethylene-propylene polymer, and an agent which substantially increases the tackiness of the uncured rubber, and providing a cured rubber of good physical characteristics, and of reduced overall cost.

Yet another object is to provide a composition consisting essentially of an extender oil and a tackifying agent, preferably in certain relative proportions, and which is particularly adapted for addition to an uncured ethylene-propylene polymer, for readily processing such uncured rubber and increasing the tackiness thereof, and resulting in a cured rubber of good physical properties comparable to a cured rubber produced without employing such tackifying agent.

Still another object is to provide procedure for fabrication of a rubber article, particularly a tire, formed of several, e.g., two or more, layers of material containing therebetween an uncured ethylene-propylene rubber composition as described above, so that such layers of material have improved adhesion to each other, and result in a cured rubber having good physical properties.

Other objects and advantages of the invention will appear hereinafter.

We have unexpectedly found that by incorporating amorphous polypropylene in an uncured ethylene-propylene rubber, particularly one which contains a high molecular weight ethylene-propylene polymer, a substantial amount of an extender oil can be employed which together with the polypropylene provides an uncured ethylene-propylene rubber blend having a Mooney viscosity rendering the blend readily processible while substantially increasing the tackiness of the uncured rubber composition over that of the tackiness of the same composition in the absence of the polypropylene. Further, it has also surprisingly been found that when employing the above noted uncured ethylene-propylene rubber blend, particularly one which includes a high molecular weight ethylene-propylene polymer, such as the terpolymer, together with substantial amounts of extender oil and the polypropylene, the uncured composition has substantially reduced nerviness, and the resulting cured rubber has good tensile strength, as compared to a rubber produced from a similar rubber blend but excluding polypropylene, and regardless as to whether the amount of extender oil in such blend is increased or reduced.

Thus, it is seen that the incorporation of the amorphous polypropylene into the oil extended uncured ethylene-propylene rubber has several advantages. In the first place it permits the use of high molecular weight ethylene-propylene polymers which produce superior cured rubbers, but which heretofore have been difficult to process either in the pure state or in the oil extended condition. Further, the presence of the polypropylene permits the use of substantially larger amounts of extender oil with a given amount of ethylene-propylene rubber and therefore enhances the economics of the production of these rubbers. The effectiveness of the polypropylene as a tackifier for the uncured ethylene-propylene rubber is not reduced by the presence of the relatively large amounts of extender oil, and the physical characteristics of the resulting cured rubber are not adversely affected to any significant degree. In summary, the addition of amorphous polypropylene to the uncured oil extended ethylene-propylene rubbers permits the use of higher molecular weight ethylene-propylene polymers ranging from a molecular weight of about 2,000,000 to over 4,000,000, extended with oil in substantial amounts to produce a polymer mixture or blend having enhanced tackiness and reduced nerviness characteristics and having a Mooney viscosity, e.g., of the order of about 50 to about 70, rendering the blend readily processible into cured finished rubber products exhibiting good strength properties.

As an additional feature of the invention, it has been found that a mixture of the polypropylene in an extender oil can be provided, containing certain proportions of the polypropylene with respect to the extender oil so that such mixture can be added directly to the ethylene-propylene polymer in the essentially pure state to provide readily and directly an uncured ethylene-propylene rubber blend according to the invention containing the proper proportions of polypropylene and extender oil with respect to the ethylene-propylene polymer. Thus, the mixture of polypropylene in extender oil noted above can be stored ready for incorporation into the uncured ethylene-propylene polymer when required, to provide the proper blend of uncured ethylene-propylene rubber according to the invention wihout the danger of miscalculation of amounts and additional mixing and handling which would ordinarily be required.

Polypropylenes suitable for use according to the invention are amorphous polypropylenes which can vary from a liquid to a semi-solid or solid, e.g., of wax-like consistency, and generally range in molecular weight from about 300 to about 25,000. Preferred polypropylenes for purposes of the invention are those in solid waxy form, and having a molecular weight range from about 5,000 to about 25,000. If desired, a blend of the liquid and solid forms of the amorphous polypropylenes can be employed. The polypropylenes are known materials generally produced by catalytic polymerization of propylene derived, for example, from a petroleum hydrocarbon source, in the presence of catalysts such as titanium trichloride, and aluminum or lithium alkyls. A typical process for producing such polypropylenes is described in Journal of Polymer Science Part C, No. 1, pp. 237–279 (1963)—"Ziegler Polymerization of Olefins" by J. Boor, Jr.

The polypropylene are generally soluble in benzene, ethyl ether, petroleum and coal tar distillates, and chlorinated hydrocarbons, and insoluble in ethyl and isopropyl alcohols, acetone and most highly polar solvents. Examples of commercially available forms of polypropylenes suitable for incorporation into an ethylene-propylene rubber according to the invention are the liquid amorphous polypropylene marketed as "Amopol C-175" or "Polypropene C-175," and the solid waxy amorphous polypropylene marketed as "Oronite Polypropylene." The terms "polypropylene" and "polypropene" are used interchangeably in the art to denote the same material, which is described above.

The polypropylene tackifier can be incorporated in an ethylene-propylene copolymer or terpolymer in varying proportions, preferably employing a minor amount of amorphous polypropylene, which can range from about 2.5 to about 50 parts, usually about 5 to about 50 parts, of polypropylene, to 100 parts of the polymer, by weight.

The amorphous polypropylene can be incorporated in the oil extended rubber or as noted above the polypropylene can be incorporated in the extender oil, and the resulting mixture can be added to the ethylene-propylene copolymer or terpolymer, at the time of compounding the uncured rubber formulation for use. The extender oil used for preparing the blend of uncured ethylene-propylene rubber containing polypropylene according to the invention, can be an oil of paraffinic, naphthenic or aromatic character. These oils can be characterized generally as hydrocarbon extender oils for ethylene-propylene polymers, usually obtained from a petroleum source. The paraffinic oils which can be employed as extenders can have an aniline point range of about 189 to about 240° F., the naphthenic extender oils from about 150 to about 250° F., and the aromatic extender oils from about 100 to about 130° F. These extender oils, for example, are marketed as the "Flexons" by Enjay Chemical Company, and the paraffinic, naphthenic, and aromatic oils are marketed as the "Sunpar", "Sunthene" and "Sundex" oils by Sun Oil Company.

Mooney plasticity or viscosity of the ethylene-propylene rubber blend is a function of process oil viscosity. The greater the amount of process oil added to the ethylene-propylene polymer the lower the Mooney viscosity of the resulting blend. For best processibility of an uncured ethylene-propylene blend, e.g., for producing tires, the blend of oil extender and polymer usually is adjusted to a Mooney viscosity of between about 50 and about 70. Although Mooney viscosity of the oil extended polymer blend can be reduced to between about 30 and about 50 by addition of larger amounts of extender oil, such low viscosity blends are only suitable for certain applications such as to provide extrusion stocks.

Thus, according to prior art procedure, e.g., employing an ethylene-propylene terpolymer raw gum of intermediate molecular weight between about 1,000,000 and 1,500,000 and having a Mooney viscosity of about 135, 100 parts of extender oil such as "Flexon 391" (an aromatic oil) produces a polymer-oil blend having a Mooney viscosity of about 50 to about 60. Such a polymer-oil blend loaded with a normal amount of carbon black produces a cured rubber having a tensile strength of about 2,000 p.s.i.

According to the invention, a higher molecular weight ethylene-propylene terpolymer can be employed, e.g., having a molecular weight of between about 2,000,000 and about 2,500,000, and having a Mooney viscosity of between about 175 and about 200, and by adding 100 parts of "Flexon 391" and 10 parts of amorphous polypropylene per 100 parts of ethylene-propylene terpolymer, a workable Mooney viscosity of between about 50 and 60 is achieved for the blend, and this uncured rubber blend loaded with carbon black has substantial tackiness suitable for tire manufacture, and resulting in a cured rubber having a tensile strength comparable to that of the rubber noted above, e.g., about 2,000 p.s.i. Thus, a higher molecular weight polymer can be employed and the polypropylene functions in conjunction with the extender oil to provide a blend of workable viscosity, while the effectiveness of the polypropylene as a tackifier is maintained.

A further feature of the invention is that additional quantities of extender oils can be added to the very high molecular weight ethylene-propylene polymers, e.g., having a molecular weight of about 3,000,000 to about 4,500,000, in the presence of polypropylene, which are capable of being formulated into useful rubber products. Thus, according to this feature of the invention, amounts substantially greater than 100 parts of extender oil per 100 parts ethylene-propylene polymer can be employed with high molecular weight polymers to provide processible uncured rubber blends by means of polypropylene. For example, from about 125 to about 200 or more parts of extender oil together with polypropylene can be employed per 100 parts of such high molecular weight rubbers. However, processible oil-polymer blends can also be produced to advantage employing such increased amounts of extender oil together with polypropylene in conjunction with intermediate molecular weight ethylene-propylene polymers such as polymers having a molecular weight of about 2,000,000 to about 2,500,000 and a Mooney viscosity of about 175 to about 200.

The greatest advantages of the invention are achieved employing the high molecular weight ethylene-propylene polymers, including copolymers and terpolymers, having a molecular weight substantially above 2,000,000, in conjunction with polypropylene polymers, in accordance with the invention principles since as previously noted, such high molecular weight polymers when compounded produce cured rubbers having superior properties, e.g., tensile strength. When employing such polymers, e.g., having a molecular weight of about 2,500,000 to about 4,000,000 and above, and utilizing between about 150 and about 200 parts of hydrocarbon extender oil per 100 parts of the polymer, together with polypropylene, an oil-polymer blend can be obtained having a Mooney viscosity of about 50 to about 70 within the best processing range, while retaining the tack provided by the polypropylene. If polypropylene is not added to such a blend, the Mooney viscosity of the resulting blend containing only the polymer and the 150 to 200 parts of extender oil per 100 parts of polymer, would be substantially above 70 and would be difficult to process and would have little or no tack, which would render the blend substantially useless, for making tires. If additional extender oil were added to such a polymer-oil blend and in the absence of polypropylene, in order to reduce the Mooney viscosity of the workable range of 50 to 70, the resulting cured rubber would have seriously impaired tensile strength, reduced abrasion resistance and other inferior properties.

The relative proportions of polypropylene and hydrocarbon extender oil incorporated with the ethylene-propylene polymer are adjusted so that the polypropylene and extender oil together are present in an amount sufficient to reduce the Mooney viscosity of the composition so that the resulting composition is processible. This is usually achieved when said amount is such that the Mooney viscosity of such composition or blend is between about 50 and about 70, as noted above. Thus, for example, where a lower molecular ethylene-propylene polymer is employed, e.g., one having a molecular weight less than about 2,000,000, a smaller proportion of polypropylene is usually required with a given amount of extender oil, e.g., 50 parts of extender oil per 100 parts of ethylene-propylene polymer, to obtain such workable viscosity while retaining tackiness. Where a higher molecular weight ethylene-propylene polymer is employed, e.g., having a molecular weight substantially greater than 2,000,000, a larger proportion of polypropylene is usually employed, with such given amount of extender oil to achieve the above noted workable viscosity, while imparting tackiness to the composition. Thus, the polypropylene functions in conjunction with the extender oil to adjust and to reduce the Mooney viscosity of the ethylene-propylene polymer, and the relative proportions of polypropylene and extender oil are balanced to provide a processible uncured rubber composition, while imparting substantial tackiness thereto, but without significant adverse effect on the physical properties of the cured rubber.

Thus, usually, at least about 50 parts of extender oil together with polypropylene is employed, and at least about 100 parts of extender oil together with polypropylene is employed for higher molecular weight ethylene-propylene polymers or rubbers, e.g. having a molecular weight of at least about 2,000,000, based on 100 parts by weight of such rubbers.

As previously noted, a mixture of the oil extender together with the polypropylene incorporated therein can be prepared, and such mixture added directly to the ethylene-propylene polymer, instead of adding these components separately to such polymer. The proportions of polypropylene and extender oil in such mixture are arranged so that the addition of a certain proportion of such mixture to the ethylene-propylene polymer will automatically provide an oil extended blend containing polypropylene, with all the components present in the proper proportions noted above for producing a processible oil-polymer blend of about 50 to about 70 Mooney viscosity. For this purpose, such mixture can contain, for example, about 5 to about 80 parts of amorphous polypropylene per 100 parts of extender oil, usually about 5 to about 50 parts of such polypropylene per 100 parts of extender oil. The amorphous polypropylene when used in liquid or solid form is miscible with and soluble in the hydrocarbon oil extender in the ranges of proportions noted above.

Various conventional additives can be incorporated in the ethylene-propylene rubber blends containing the extender oil and the polypropylene of the invention in preparing the uncured or unvulcanized rubber compound. These include, for example, fillers, pigments, activators, accelerators, cross-linking agents or promotors, and plasticizers.

Fillers generally employed in rubber formulations are the carbon blacks. Any well known type of carbon black can be employed for incorporation in the oil extended ethylene-propylene rubber formulations of the invention including furnace blacks, thermal blacks and channel blacks. The carbon black filler employed in the oil extended ethylene-propylene rubber formulations of the invention including polypropylene, improves abrasion resistance, tensile strength and tear resistance of the cured rubber compound. The carbon black can be employed in amounts ranging from about 5 to about 200 parts, preferably about 25 to about 75 parts, per 100 parts of the ethylene-propylene copolymer or terpolymer rubber employed as the base material by weight.

Pigments are also generally employed in rubber formulations, and such materials can also be incorporated in the ethylenepropylene uncured rubber formulations including extender oil and polypropylene of the invention. Such pigments include, for example, metal oxides such as zinc oxide, titanium dioxide, antimony oxide, magnesium oxide, calcium oxide, lead oxide, and other pigments such as calcium carbonate, barium sulfate, zinc sulfide, talc, and the like. Such pigments in addition to functioning to impart color to the cured rubber, also can function as a filler. The above metal oxides further function to activate the cure of the rubber and thus also function as a catalyst. The proportions of such pigments which can be employed can range from about 1 to as high as about 250 parts, preferably about 20 to about 100 parts, per 100 parts by weight of the ethylene-propylene copolymer or terpolymer base rubber. Where metal oxides are employed, these materials are generally employed in an amount of about 1 to about 10 parts of the ethylene-propylene rubber, by weight.

Accelerators can also be employed in the rubber formulation of the invention. Such accelerators can include any of the well known types of accelerators such as carbamates, thiazoles, aldehyde-amines, sulfenamides, and thiuram sulfides, e.g., the monosulfide, disulfide or tetrasulfide. Preferred materials are the dithiocarbamates, such as zinc dimethyl dithiocarbamate, and the thiuram disulfides, e.g., tetramethyl thiuram disulfide. The proportions of such accelerators which can be employed range from about 0.5 to about 3 parts, per 100 parts of the base ethylene-propylene rubber, by weight.

Cross-linking systems for curing the ethylene-propylene rubber include in addition to the above noted accelerators, a cross-linking agent. Thus, for example, sulfur is a well known cross-linking agent or vulcanizer for this purpose. However, in place of sulfur there can be employed as cross-linking agent a peroxide such as benzoyl peroxide, di-tertiary butyl peroxide, dicumyl peroxide, and the like; alkylene polyamines, such as ethylene diamine and triethylene tetraamine; quinone dioxime, and substituted dioximes such as dibenzo quinone dioxime, and the like. Combinations of such cross-linking agents also can be employed. Where the ethylene-propylene copolymer is employed, which is an essentially saturated rubber, the above noted organic cross-linking agents preferably are employed, utilizing only a very small amount, if any, of sulfur. Where the ethylene-propylene terpolymer rubber is employed, and which has some degree of unsaturation, either sulfur or an organic cross-linking agent of the above noted types, or a combination thereof, can be employed. The proportion of cross-linking agent utilized can range from about 0.25 to about 5 parts, preferably about 1 to about 3 parts, per 100 parts of the ethylene-propylene rubber by weight.

If desired, plasticizers can also be incorporated in the rubber formulation of the invention. Such plasticizers include, for example, polyethers such as the glycol polyethers, polyesters such as the dialkyl phthalates, e.g., dibutyl or dioctyl phthalate, and phosphate esters such as tricresyl phosphate and dibutyl phenyl phosphate. The proportions of such plasticizers which can be employed can range from about 1 to about 20 parts or more per 100 parts of the ethylene-propylene rubber, by weight.

The amorphous polypropylene can be incorporated into the ethylene-propylene copolymer or terpolymer rubber, or rubber formulation, including any one or more of the hydrocarbon oil additives noted above, in any suitable manner. Thus, for example, the specific ethylene-propylene rubber polymer employed can be placed on a rubber mill to break the rubber down. This applies also to the oil extended copolymer and terpolymer ethylene-propylene rubber. The pigment and carbon black can be added and the resulting mixture blended thoroughly on the mill. Then the amorphous polypropylene can be blended into the mixture on the mill. Where a mixture of the hydrocarbon oil extender and the polypropylene is first provided, as previously described, a suitable amount of such mixture can be added to the rubber mixture on the mill either before or after incorporation of carbon black and pigment, where the latter is employed. Following this, the cross-linking system including accelerator and cross-linking agent can be incorporated, and the entire mixture thoroughly blended on the mill, providing an uncured rubber formulation according to the invention which has improved tackiness and which is particularly valuable in the manufacture of tires. During such blending in the rubber mill no heat is applied and cooling water is circulated in the rolls of the mill, so as to prevent any premature curing of the rubber before it is employed in the desired application. The resulting uncured rubber can be stored for several days without losing its desirable tacky properties.

In order to vulcanize or cure the above noted formulation after it has been employed in the manufacture of a part such as a rubber tire, the tire, for example, containing the adherent layers of uncured rubber compound according to the invention, is placed in a mold in a press and the part is molded under high pressure, e.g., of the order of 150 pounds per square inch, with the application of heat at temperatures, e.g., of the order of about 300° to about 325° F. for a period of about 15 to about 60 minutes to provide the proper cure.

The following are examples of practice of the invention. In tests carried out employing the rubber formulations of the examples below, in the general procedure followed for testing the tackiness of the uncured rubber, a sheet of uncured rubber according to the formulations of the examples below is folded over on itself and a weight is placed thereon for a period of about 5 minutes. After this period the weight is removed and the two layers are pulled apart. The relative adhesion between such adjacent layers of rubber is determined by the amount of force necessary to pull the layers apart.

In each of the examples below, the proportions of components are given in terms of parts by weight unless otherwise indicated.

EXAMPLE 1

An amorphous polypropylene, Oronite polypropylene, is incorporated into an ethylene-propylene rubber extended with a hydrocarbon oil, Royalene X400, in the proportions noted below, by blending such polypropylene into the oil extended ethylene-propylene rubber on a rubber mill, to form the following compositions according to the invention, consisting essentially of ethylene-propylene rubber, amorphous polypropylene and extender oil.

|  | 1 | 2 | 3 |
|---|---|---|---|
| Royalene X400 | 200 | 200 | 200 |
| Oronite polypropylene | 40 | 20 | 10 |

The above compositions have substantial tackiness and a Mooney viscosity from about 50 to about 60.

These compositions are illustrative of the basic uncured ethylene-propylene rubber compositions according to the invention. Additives of the usual type and described above can then be in incorporated into these basic compositions, as illustrated by the compositions noted below, to produce complete uncured ethylene-propylene rubber compositions ready to be cured into products. If desired, the basic compositions of the invention illustrated above and containing the three essential components, namely, the ethylene-propylene polymer, the hydrocarbon extender oil and the amorphous polypropylene, can be packaged and marketed, and the desired additives incorporated into such compositions at the time of use thereof to form complete ethylene-propylene rubber formulations for forming into desired articles, e.g. tires, and curing thereof.

Thus, from the above basic compositions of the invention, the following two series of compositions are prepared by incorporation of the additives noted below, including in Series I compositions A, B and C, and in Series II compositions E, F and G. Compositions D and H of Series I and II are controls, neither of which contains any polypropylene. The properties of the cured rubbers produced from each of the compositions of these two series are also set forth below:

SERIES I

|  | A | B | C | D |
|---|---|---|---|---|
| Royalene X400 | 200.00 | 200.00 | 200.00 | 200.00 |
| Oronite polypropylene | 40.00 | 20.00 | 10.00 | |
| Furnace black (Philblack A) | 120.00 | 120.00 | 120.00 | 120.00 |
| Stearic acid | 2.00 | 2.00 | 2.00 | 2.00 |
| Zinc oxide | 10.00 | 10.00 | 10.00 | 10.00 |
| 2-mercaptobenzothiazole | 1.00 | 1.00 | 1.00 | 1.00 |
| Tetramethyl thiuram disulfide | 3.00 | 3.00 | 3.00 | 3.00 |
| Sulfur | 3.00 | 3.00 | 3.00 | 3.00 |

Cure 30 minutes at 307° F.

Properties:
| | | | | |
|---|---|---|---|---|
| Tensile strength, p.s.i. | 1,300 | 1,690 | 1,860 | 2,050 |
| Elongation, percent | 330 | 365 | 400 | 400 |
| Hardness, Shore A, pts | 54 | 56 | 56 | 56 |

SERIES II

|  | E | F | G | H |
|---|---|---|---|---|
| Royalene X400 | 200.00 | 200.00 | 200.00 | 200.00 |
| Oronite polypropylene | 40.00 | 20.00 | 10.00 | |
| Furnace black (United 65 SPF black) | 160.00 | 120.00 | 120.00 | 120.00 |
| Stearic acid | 2.00 | 2.00 | 2.00 | 2.00 |
| Zinc oxide | 10.00 | 10.00 | 10.00 | 10.00 |
| Naugatuck accelerator 133 | 4.00 | 4.00 | 4.00 | 4.00 |
| Tetramethyl thiuram disulfide | 2.00 | 2.00 | 2.00 | 2.00 |
| Sulfur | 3.00 | 3.00 | 3.00 | 3.00 |

Cure 30 minutes at 307° F.

Properties:
| | | | | |
|---|---|---|---|---|
| Tensile strength, p.s.i. | 1,350 | 1,530 | 1,550 | 2,000 |
| Elongation, percent | 240 | 270 | 290 | 325 |
| Shore A hardness, pts | 68 | 63 | 62 | 62 |

The 200 parts of Royalene X400 incorporated in all of the compositions noted above is composed of a blend of 100 parts ethylene-propylene terpolymer, containing about 40 to about 50 mole percent ethylene, about 60 to about 50 mole percent propylene, and about 0.5 mole per kilogram of terpolymer of 2-methylenenorbornene; and 100 parts of "Sunthene 2100," a naphthenic extender oil. The ethylene-propylene terpolymer of Royalene X400 has the following properties:

Molecular weight ---------------- Over 2,000,000.
Mooney viscosity ---------------- Over 200.
Resistance to:
    Weather ---------------------- Excellent.
    Ozone ------------------------ Do.
    Acids ------------------------ Good to excellent.
    Bases ------------------------ Do.
    Abrasion --------------------- Good.
    Tearing ---------------------- Do.
    Steam ------------------------ Excellent.
    Compression set -------------- Good.
    Dynamic properties ----------- Good to excellent.
    Color stability --------------- Excellent.
    Electrical properties --------- Do.
    Tack ------------------------- Poor.
    Cord adhesion ---------------- Do.
    Cure rate -------------------- Medium.
    Oil loading ------------------ Excellent.
    Black loading ---------------- Do.
    Cold flow -------------------- Do.

"Sunthene 2100" naphthenic type oil has the following properties:

Viscosity, SUS at 100° F. ---------------------- 1001
Viscosity, SUS at 210° F. ---------------------- 68.4
API gravity at 60° F. -------------------------- 23.2
Specific gravity at 60° F. --------------------- .915
Flash, open cup, ° F. -------------------------- 450
Fire, ° F. ------------------------------------- 490
Pour point, ° F. ------------------------------- +10
Color, ASTM ------------------------------------ 1.25
Ultraviolet absorptivity at 260 m$\mu$ --------- 1.0
Molecular weight ------------------------------- 420
Aniline point, ° F. ---------------------------- 206
Viscosity-gravity constant --------------------- .845
Clay-gel analysis, wt. percent:
    Asphaltenes -------------------------------- 0.0
    Polar compounds ---------------------------- 1.0
    Aromatics ---------------------------------- 22.2
    Saturates ---------------------------------- 76.5
Silica-gel aromatics, wt. percent -------------- 25.2
Refractive index at 68° F. --------------------- 1.4983

The Oronite Polypropylene employed in the above compositions is a solid waxy amorphous polypropylene having an average molecular weight of about 10,000.

The Mooney viscosity of the Royalene X400 blend including extender oil is about 75. The Mooney viscosity of the mixtures of the Royalene X400 blend and the polypropylene in the various compositions of the two series of formulations above ranges from about 50 to about 60.

The Naugatuck Accelerator 133 in the above formulations E, F, G and H is a proprietary accelerator believed to be a metal dithiocarbamate type accelerator.

Compositions A, B, C, E, F and G according to the invention are observed to have substantial and very desirable tackiness of the type which is necessary for tire manufacture, whereas Compositions D and H, the controls, containing no polypropylene, have little or no tackiness. The tackiness of Compositions A, B, D, E, F and G persists for several days, e.g., up to about 5 days.

It is also observed that Compositions A, B, C, E, F and G, including both the extender oil in substantial amount together with polypropylene, and having a Mooney viscosity between about 50 and about 60 as noted. above, are readily processible whereas the control Compositions D and H containing extender oil but no polypropylene are more difficult to process. Further, the nerviness of the uncured rubber formulations of the invention A, B, C, E, F and G, is substantially less than the nerviness of the uncured control formulations D and H.

It is also noted that the cured rubbers produced from the uncured formulations, A, B, C, E, F and G, of the invention including polypropylene together with the extender oil have acceptable and comparable properties of tensile strength, elongation and hardness, to the cured rubbers produced from control compositions D and H in the absence of polypropylene, showing that the incorporation of the polypropylene into the uncured ethylene-propylene rubber formulations does not adversely affect or degrade the acceptable quality of the resulting cured rubber.

EXAMPLE 2

An additional 50 parts of naphthenic extender oil is added to the Royalene X400 in each of the compositions of Series I and II of Example 1, so that there is present in each of the resulting mixtures 150 parts of extender oil per 100 parts of the ethylene-propylene terpolymer.

The Mooney viscosity of the mixtures of Royalene X400, the additional 50 parts of extender oil and the polypropylene, employed in the various uncured rubber compositions above according to the invention, ranges from about 50 to about 60, and such compositions have good tack and reduced nerviness, and are easily processed. On the other hand, the tack of the blend of Royalene X400 and the 50 additional parts of extender oil, and containing no polypropylene, employed in the control compositions corresponding to Compositions D and H above, is inadequate.

Also, the resulting rubbers produced from the above invention compositions containing ethylene-propylene terpolymer, 150 parts of naphthenic oil extender and polypropylene have good physical properties, including tensile strength, elongation and hardness, comparable to those of the cured rubbers produced from the corresponding control compositions containing no polypropylene.

EXAMPLE 3

Compositions corresponding to Compositions A to H of Example 1 are prepared, except that the 200 parts of Royalene X400 in each of these compositions is replaced by a blend of 100 parts of Royalene 301X which contains no extender oil, and 50 parts of the naphthenic extender oil "Sunthene 2100." Royalene 301X is an ethylene-propylene terpolymer of the same chemical composition as the terpolymer in Royalene X400 noted above, but has a lower molecular weight of about 1,000,000 and a Mooney viscosity of about 130, without any extender oil.

The Mooney viscosity of the mixtures of Royalene 301X, the 50 parts of extender oil and the polypropylene, employed in the various uncured rubber compositions above, containing polypropylene according to the invention, ranges from about 50 to about 70, and such compositions have good tack, reduced nerviness and are easily processed. The Mooney viscosity of the blend of Royalene 301X and the 50 parts of extender oil, and containing no polypropylene, employed in the control compositions corresponding to Compositions D and H in Example 1 above, is above 70, i.e., about 90. Such control compositions have little or no tackiness and are difficult to process.

The resulting cured rubbers produced from the above invention compositions containing Royalene 301X terpolymer, 50 parts of naphthenic oil extender and polypropylene have comparable physical properties to those of the cured rubbers produced from the corresponding control compositions containing no polypropylene, similar to the comparisons in Example 1.

EXAMPLE 4

Compositions are prepared corresponding to Compositions A to H of Example 1, except that the 200 parts of Royalene X400 are replaced by a blend of 100 parts of ethylene-propylene copolymer having a molecular weight of about 1,000,000 and a Mooney viscosity of about 135, and 50 parts of naphthenic extender oil, "Sunthene 2100," and 20 parts of the amorphous polypropylene, the latter component not being present in the controls.

Comparative properties and results for the uncured invention compositions containing the ethylene-propylene copolymer, 50 parts of naphthenic extender oil and polypropylene according to the invention, in relation to the controls containing such ethylene-propylene copolymer and naphthenic extender oil, but no polypropylene, corresponding to control Compositions D and H of Example 1, are similar to those noted above in Example 1.

In summary, such uncured compositions including both the extender oil and polypropylene have a Mooney viscosity between 50 and 70, are readily processed, have good tackiness and reduced nerviness, whereas the corresponding uncured rubber compositions containing no polypropylene and corresponding to controls D and H of Example 1, are more difficult to process and have poor tack. Further, the incorporation of the polypropylene into the compositions according to the invention does not adversely affect the physical properties of the cured rubbers as compared to the physical properties of the cured rubbers formed from the control compositions containing no polypropylene.

EXAMPLE 5

The procedure of Example 1 is substantially carried out but employing in place of the 200 parts of Royalene X400, 100 parts of an ethylene-propylene copolymer having a molecular weight of about 2,000,000 and a Monney viscosity above 200, and 100 parts of an aromatic extender oil.

Results similar to those obtained in Example 1 are observed.

EXAMPLE 6

The formulations A, B, C, E, F and G of Example 1 are prepared except that in place of adding the polypropylene to the Royalene X400 blend containing the extender oil and the ethylene-propylene terpolymer, mixtures J, K and L set forth below are prepared, each containing 100 parts of the naphthenic extender oil (Sunthene 2100), and the appropriate amount of polypropylene required for each of the respective Compositions, A, B, C, E, F and G. Thus, the mixtures J, K and L are as follows:

|  | J | K | L |
|---|---|---|---|
| Naphthenic extender oil (Sunthene 2100) | 100 | 100 | 100 |
| Oronite polypropylene | 40 | 20 | 10 |

In preparing formulations corresponding to A and E of Example 1, mixture J is simply incorporated with 100 parts of the ethylene-propylene terpolymer employed in Royalene X400, and for preparation of Compositions B and F, mixture K is incorporated with 100 parts of such terpolymer, and for preparation of Compositions C and G, mixture L is incorporated with such terpolymer.

From the above, it is seen that provision of mixtures of hydrocarbon extender oil and polypropylene in accordance with the invention, permits compounding of the uncured rubber formulations simply by adding such mixtures or blends in suitable amounts to the ethylene-propylene polymer, and avoiding individual addition of the extender oil and polypropylene components to the rubber formulation.

EXAMPLE 7

The formulations A to H according to Example 3 above are prepared, employing 100 parts of Royalene 301X terpolymer but employing in place of the 50 parts of Sunthene 2100 of Example 3, 50 parts of the aromatic extender oil "Flexon 391" marketed by Enjay Chemical Company and having the following properties:

| | |
|---|---|
| Viscosity SSU at 100° F. | 4010 |
| Viscosity SSU at 210° F. | 90 |
| API Gravity at 60° F. | 13.7 |
| Aniline point ° F. | 120 |
| Clay/silica gel analysis (wt. percent): | |
| Aromatics | 66.5 |
| Saturates | 30.5 |
| Polar compounds | 3.0 |

The results obtained are similar to those obtained in Example 3.

EXAMPLE 8

The formulations A to H according to Example 3 above are prepared, employing 100 parts of Royalene 301X terpolymer but employing in place of the 50 parts of Sunthene 2100 of Example 3, 50 parts of the paraffinic extender oil "Flexon 865" marketed by Enjay Chemical Company and having the following properties:

| | |
|---|---|
| Viscosity SSU at 100° F. | 332 |
| Viscosity SSU at 210° F. | 55 |
| API gravity at 60° F. | 30.6 |
| Aniline point ° F. | 233 |
| Clay/silica gel analysis (wt. percent): | |
| Aromatics | 21.0 |
| Saturates | 77.8 |
| Polar compounds | 1.2 |

The results obtained are similar to those in Example 3.

From the foregoing, it is seen that the invention provides uncured ethylene-propylene rubber formulations which by incorporation of amorphous polypropylene together with hydrocarbon extender oil, forms readily processible formulations, particularly when employing the preferred high molecular ethylene-propylene polymers, preferably the terpolymer, while at the same time affording uncured rubber formulations which have substantial tackiness and reduced nerviness, and which are eminently suited for the fabrication of tires. Of further significance, the incorporation of substantial amounts of extender oil and also polypropylene into the uncured ethylene-propylene formulations of the invention do not degrade the cured rubber formed from the uncured invention formulations, and such rubbers have good physical properties, including tensile strength, elongation and hardness comparable to rubbers produced in the absence of polypropylene. Also, the use of large proportions of extender oil together with the ethylene-propylene polymer enhances the economics of the system. In addition, the invention provides novel and convenient blends of polypropylene and the extender oils, which are readily adapted for addition to the ethylene-propylene polymer to provide readily and directly the uncured rubber formulations of the invention.

While we have described particular embodiments of our invention for the purpose of illustration, it should be understood that various modifications and adaptations thereof may be made within the spirit of the invention and within the scope of the appended claims.

We claim:

1. An uncured ethylene-propylene rubber composition consisting essentially of an ethylene-propylene rubber, from about 2.5 to about 50 parts of amorphous polypropylene effective to impart substantial tackiness to the rubber, and a hydrocarbon extender oil in an amount of at least about 50 parts, based on 100 parts by weight of said rubber, said polypropylene and said extender oil together being present in an amount sufficient to reduce the Mooney viscosity of the composition so that the resulting composition is processible, said extender oil being selected from the group consisting of paraffinic oils having an aniline point range of about 189 to about 240° F., naphthenic oils having an aniline point range from about 150 to about 250° F., and aromatic oils having an aniline point range from about 100 to about 130° F., and said amorphous polypropylene having a molecular weight range from about 300 to about 25,000.

2. An uncured ethylene-propylene rubber composition consisting essentially of an ethylene-propylene rubber, from about 2.5 to about 50 parts of amorphous polypropylene having a molecular weight range from about 300 to about 25,000, and a hydrocarbon extender oil in an amount of at least about 50 parts, based on 100 parts by weight of said rubber, said polypropylene and said extender oil together being present in an amount sufficient to form a blend including said ethylene-propylene rubber, having a Mooney viscosity in the range from about 50 to about 70, said extender oil being selected from the group consisting of paraffinic oils having an aniline point range of about 189 to about 240° F., naphthenic oils having an aniline point range from about 150 to about 250° F., and aromatic oils having an aniline point range from about 100 to about 130° F.

3. An uncured ethylene-propylene rubber composition consisting essentially of an ethylene-propylene rubber having a molecular weight of at least about 2,000,000, from about 2.5 to about 50 parts of amorphous polypropylene effective to impart substantial tackiness to the rubber, and a hydrocarbon extender oil in an amount of at least about 100 parts, based on 100 parts by weight of said rubber, said polypropylene and said extender oil together being present in an amount sufficient to reduce the Mooney viscosity of the composition so that the resulting composition is processible, said extender oil being selected from the group consisting of paraffinic oils having an aniline point range of about 189 to about 240° F., naphthenic oils having an aniline point range from about 150 to about 250° F., and aromatic oils having an aniline point range from about 100 to about 130° F., and said amorphous polypropylene having a molecular weight range from about 300 to about 25,000.

4. An uncured ethylene-propylene rubber composition consisting essentially of an ethylene-propylene rubber having a molecular weight of at least about 2,000,000, from about 2.5 to about 50 parts of amorphous polypropylene, said polypropylene having a molecular weight in the range from about 300 to about 25,000, and a hydrocarbon extender oil in an amount of at least about 100 parts, based on 100 parts by weight of said rubber, said polypropylene and said extender oil together being present in an amount sufficient to form a blend including said ethylene-propylene rubber, having a Mooney viscosity in the range from about 50 to about 70, said extender oil being selected from the group consisting of paraffinic oils having an aniline point range of about 189 to about 240° F., naphthenic oils having an aniline point range from about 150 to about 250° F., and aromatic oils having an aniline point range from about 100 to about 130° F.

5. An uncured, ethylene-propylene rubber composition consisting essentially of an ethylene-propylene rubber having a molecular weight of at least about 2,000,000, from about 2.5 to about 50 parts of amorphous polypropylene, said polypropylene having a molecular weight in the range from about 5,000 to about 25,000, and from about 125 to about 200 parts of a hydrocarbon extender oil, based on 100 parts by weight of said rubber, said polypropylene and said extender oil together being present in an amount sufficient to reduce the Mooney viscosity of the composition so that the resulting composition is processible, said extender oil being selected from the group consisting of paraffinic oils having an aniline point range of about 189 to about 240° F., naphthenic oils having an aniline point range from about 150 to about 250° F., and aromatic oils having an aniline point range from about 100 to about 130° C.

6. An uncured ethylene-propylene rubber composition consisting essentially of an ethylene-propylene rubber having a molecular weight of at least about 2,000,000, from about 2.5 to about 50 parts of amorphous polypropylene, said polypropylene having a molecular weight in the range from about 5,000 to about 25,000, and from about 150 to about 200 parts of a hydrocarbon extender oil, based on 100 parts by weight of said rubber, said polypropylene and said extender oil together being present in an amount sufficient to form a blend including said ethylene-propylene rubber, having a Mooney viscosity in the range from about 50 to about 70, said extender oil being selected from the group consisting of paraffinic oils having an aniline point range of about 189 to about 240° F., naphthenic oils having an aniline point range from about 150 to about 250° F., and aromatic oils having an aniline point range from about 100 to about 130° F.

7. An uncured rubber composition as defined in claim 1, wherein said ethylene-propylene rubber is an ethylene propylene terpolymer.

8. An uncured rubber composition as defined in claim 1, wherein said ethylene-propylene rubber is an ethylene-propylene copolymer.

9. An uncured ethylene-propylene rubber composition consisting essentially of an ethylene-propylene rubber having a molecular weight in the range from about 2,000,000 to about 4,500,000, from about 2.5 to about 50 parts of amorphous polypropylene, said polypropylene having a molecular weight in the range from about 300 to about 25,000, and from about 125 to about 200 parts of a hydrocarbon extender oil, based on 100 parts by weight of said rubber, said polypropylene and said extender oil together being present in an amount sufficient to reduce the Mooney viscosity of the composition so that the resulting composition is processible, said extender oil being selected from the group consisting of paraffinic oils having an aniline point range of about 189 to about 240° F., naphthenic oils having an aniline point range from about 150 to about 250° F., and aromatic oils having an aniline point range from about 100 to about 130° F.

10. An uncured rubber composition as defined in claim 9, wherein said ethylene-propylene is an ethylene-propylene terpolymer.

11. An uncured rubber composition as defined in claim 9, wherein said ethylene-propylene rubber is an ethylene-propylene copolymer.

12. An uncured ethylene-propylene rubber composition consisting essentially of an ethylene-propylene rubber having a molecular weight in the range from about 2,500,000 to about 4,000,000, from about 2.5 to about 50 parts of amorphous polypropylene, said polypropylene having a molecular weight in the range from about 5,000 to about 25,000, and from about 150 to about 200 parts of a hydrocarbon extender oil, based on 100 parts by weight of said rubber, said polypropylene and said extender oil together being present in an amount sufficient to form a blend including said ethylene-propylene rubber, having a Mooney viscosity in the range from about 50 to about 70, said extender oil being selected from the group consisting of paraffinic oils having an aniline point range of about 189 to about 240° F., naphthenic oils having an aniline point range from about 150 to about 250° F., and aromatic oils having an aniline point range from about 100 to about 130° F.

13. An uncured rubber composition consisting essentially of an ethylene-propylene rubber having a molecular weight in the range from about 2,000,000 to about 4,500,000, from about 5 to about 50 parts of amorphous polypropylene, said polypropylene having a molecular weight in the range from about 5,000 to about 25,000, and from about 125 to about 200 parts of a hydrocarbon extender oil, based on 100 parts by weight of said rubber, said polypropylene and said extender oil together being present in an amount sufficient to form a blend including said ethylene-propylene rubber, having a Mooney viscosity in the range from about 50 to about 70, said extender oil being selected from the group consisting of paraffinic oils having an aniline point range of about 189 to about 240° F., naphthenic oils having an aniline point range from about 150 to about 250° F., and aromatic oils having an aniline point range from about 100 to about 130° F.

14. An uncured rubber composition as defined in claim 4, wherein said hydrocarbon extender oil is a naphthenic extender oil.

References Cited
UNITED STATES PATENTS

| | | | |
|---|---|---|---|
| 3,055,857 | 9/1962 | Hawley et al. | 260—41.5 |
| 3,198,679 | 8/1965 | Iknayan et al. | 156—306 |
| 3,220,966 | 11/1965 | Flanagan | 260—27 |

OTHER REFERENCES

Whitehouse et al., "Oil Extended EPT Breakthrough," Rubber World, May 1964, pp. 39–42.

ALLAN LIEBERMAN, Primary Examiner

U.S. Cl. X.R.

260—128.5, 889